United States Patent [19]

Gumprecht

[11] Patent Number: 4,960,580

[45] Date of Patent: Oct. 2, 1990

[54] PROCESS FOR PURIFYING HYDROGEN FLUORIDE

[75] Inventor: William H. Gumprecht, Wilmington, Del.

[73] Assignee: E. I. du Pont de Nemours and Company, Wilmington, Del.

[21] Appl. No.: 429,507

[22] Filed: Oct. 31, 1989

[51] Int. Cl.$^5$ .............................................. C01B 7/19
[52] U.S. Cl. ................................. 423/484; 203/34; 423/561.1
[58] Field of Search ............... 423/484, 561.1; 203/34; 210/702, 902

[56] References Cited

U.S. PATENT DOCUMENTS

| | | | |
|---|---|---|---|
| 3,166,379 | 1/1965 | Bradley et al. | 423/484 |
| 3,663,382 | 5/1972 | Garris | 203/91 |
| 3,687,622 | 8/1972 | Garris | 423/486 |
| 4,032,621 | 6/1977 | Meadows | 423/488 |
| 4,083,941 | 4/1978 | Jayawant et al. | 423/488 |
| 4,491,570 | 1/1985 | Wheaton et al. | 423/484 |
| 4,497,780 | 2/1985 | Barin et al. | 423/88 |
| 4,622,149 | 11/1986 | Devuyst et al. | 210/717 |
| 4,668,497 | 5/1987 | Miki | 423/484 |
| 4,756,899 | 7/1988 | Jenczewski et al. | 423/483 |

OTHER PUBLICATIONS

Jander, Spandau and Addison, "Chemistry in Nonaqueous Ionizing Solvents", Permagon Press, N.Y., vol. II, part 2, 1971, pp. 209-212.

G. Gore, "On Hydrofluoric Acid", Phil Trams, vol. 159, pp. 173-192 (1869).

Mellor, J. W., "Comprehensive Treatise on Inorganic and Theoretical Chemistry", Longmans and Green, N.Y., 1946, p. 127.

Lehms et al., Chem. Abst. 109:76161w, "Method for the Manufacture of High-Purity Hydrofluoric Acid".

*Primary Examiner*—John Doll
*Assistant Examiner*—Brian M. Bolam
*Attorney, Agent, or Firm*—Robert B. Stevenson

[57] ABSTRACT

A process for preparing hydrogen fluoride that involves treating anhydrous hydrogen fluoride containing primarily trivalent arsenic impurities with a sulfur compound capable of providing sulfide ions (e.g., $H_2S$) so as to precipitate the arsenic (i.e., as $As_2S_3$) followed by separation and recovery (e.g., by distillation or filtration) of purified anhydrous hydrogen fluoride.

13 Claims, No Drawings

PROCESS FOR PURIFYING HYDROGEN FLUORIDE

BACKGROUND OF THE INVENTION

1. FIELD OF THE INVENTION

This invention relates to a process for purifying hydrogen fluoride. More specifically but not by way of limitation, the invention relates to the removal of trivalent arsenic ($As^{+3}$) from anhydrous HF by precipitation of $As_2S_3$.

2. DESCRIPTION OF THE PRIOR ART

Anhydrous hydrogen fluoride is commercially manufactured by heating a mixture of fluorspar (a naturally occurring calcium fluoride) and sulfuric acid. The main impurities that result from such a reaction (fluorosilicic acid, silicon tetrafluoride, sulfur dioxide, sulfuric acid and water) are usually removed by fractional distillation. The resulting hydrogen fluoride has a purity of about 99.8% or better. However, hydrogen fluoride thus produced usually also contains minor amounts of certain other impurities which includes arsenic. The degree to which this impurity is present in commercial anhydrous hydrogen fluoride depends largely on the source of fluorspar. Typically, arsenic may be present at levels of from about 50 parts per million (ppm) to about 1500 ppm, again depending upon the particular source of fluorspar.

The degree of purity of anhydrous hydrogen fluoride required is to a great extent dependent on the particular end use application. Thus, it is generally known that, for such applications as found in the electronics industry such as cleaning agents and etchants in the production of semiconductors, diodes and transistors, a high degree of purity and extremely low levels of impurities are required. Typically, arsenic concentrations in terms of a few parts per billion (ppb) are desirable. Thus, the prior art discloses several anhydrous hydrogen fluoride purification processes intended to reduce the arsenic concentration to levels measured in terms of ppb. However, these known processes are characterized as involving a combination of costly reagents, equipment and/or procedures, as well as frequently requiring prolonged periods of processing time.

For example, in U.S. Pat. No. 3,687,622 the distillation of impure anhydrous hydrogen fluoride containing 1200 ppm As at very high pressures (e.g., $>115$ psia and preferably $>165$ psia) is disclosed wherein the As is removed overhead, and purified hydrogen fluoride (e.g., $<3,000$ ppb and preferably $<100$ ppb As) is recovered as bottoms product. In U.S. Pat. No. 3,663,382 As impurities are removed from anhydrous hydrogen fluoride by distillation at a pressure below 25 psia, with purified hydrogen fluoride being recovered as the overhead product.

Most of the processes disclosed in the art to reduce arsenic levels in anhydrous hydrogen fluoride involve oxidation of $As^{+3}$ to its pentavalent state ($As^{+5}$) thereby to reduce its volatility and solubility.

For example, U.S. Pat. No. 4,032,621 discloses a process for purifying anhydrous hydrogen fluoride by treating anhydrous hydrogen fluoride sequentially with an oxidizing agent, such as alkali metal permanganate or alkali metal dichromate, and then with a metal-free reducing agent, such as sodium percarbonate or sodium perborate, and hydrogen peroxide followed by distillation. Reduction of arsenic level from 50 ppm to about 5 to 30 ppb is reported.

In U.S. Pat. No. 4,083,941 a process for purifying anhydrous hydrogen fluoride is disclosed which involves treating anhydrous hydrogen fluoride with persulfuric acid or hydrogen peroxide and then treating with methanol or sulfuric acid, followed by distillation. Reduction of arsenic levels from 25 ppm to 20 to 30 ppb is disclosed with treatment time in the range of 48 to 73 hours.

In U.S. Pat. No. 3,166,379 a process for removing arsenic from hydrogen fluoride is described wherein an oxidizing agent in combination with a halogen (iodine, bromine, or chlorine) is used to oxidize the impurities to high boiling point, oxidized impurities. The purified hydrogen fluoride is then recovered by distillation. In U.S. Pat. No. 4,491,570 a process for purifying anhydrous hydrogen fluoride by treating it with elemental chlorine and hydrogen chloride or a fluoride salt, followed by distillation, is described. Reduction of arsenic from 15 ppb to less than 0.5 ppb is disclosed. In U.S. Pat. No. 4,668,497 a process involving the addition of fluorine to oxidize impurities present in hydrogen fluoride, followed by distillation, is disclosed.

In U.S. Pat. No. 4,756,899 a process for purifying anhydrous hydrogen fluoride is disclosed wherein hydrogen peroxide, in the presence of molybdenum or a molybdenum compound and a phosphate compound, is used to oxidize the volatile $As^{+3}$ to non-volatile $As^{+5}$ followed by distillation. Reduction of $As^{+3}$ from an initial range of 500 to 800 ppm to about 5 ppm in the treated hydrogen fluoride is reported.

In contrast to the known ultra-high-purity processes of the prior art, technical or industrial grade anhydrous hydrogen fluoride containing typically from about 50 to 100 ppm arsenic can usually be used in chemical processing or in the oil refining industry without too much difficulty. However, when the arsenic impurity level is higher, catalyst deactivation is usually accelerated, and at very high arsenic levels (e.g., from about 200 ppm to about 1500 ppm) corrosion of processing equipment also becomes very severe. For example, in the process of fluorinating chlorocarbons with hydrogen fluoride in the presence of antimony halide catalysts to produce fluorinated hydrocarbons, arsenic in the hydrogen fluoride will accumulate in the antimony halide catalysts, thus contributing to the accelerated deactivation of the catalysts. When the deactivated catalyst is reactivated or discarded, the presence of large amounts of arsenic in the spent antimony halide catalyst presents handling problems. The presence of large amounts of arsenic in the processing system can lead to greatly accelerated corrosion of process equipment if an oxidant, such as chlorine, is also present.

In the commercial manufacture of anhydrous hydrogen fluoride the technical grade hydrogen fluoride is purified by one or more final distillation steps. This conventional fractional distillation is effective in removing most of the major impurities, except for the arsenic impurities. Usual distillation procedures are ineffective in significantly reducing the arsenic level in anhydrous hydrogen fluoride since the arsenic is present in the trivalent ($As^{+3}$) form, as arsenic trifluoride ($AsF_3$), which will codistill with hydrogen fluoride. Consequently, there exists a need for a process that inexpensively and effectively decreases the arsenic impurities in anhydrous hydrogen fluoride to a level of less than about 100 ppm.

SUMMARY OF THE INVENTION

The present invention provides an inexpensive yet reliable process for the removal of $As^{+3}$ in anhydrous hydrogen fluoride to produce an acceptable industrial or technical grade anhydrous hydrogen fluoride. The process involves treating technical or industrial grade anhydrous hydrogen fluoride containing high levels of $As^{+3}$ with a sulfide-containing compound so as to convert the $As^{+3}$ to insoluble and non-volatile arsenic sulfide ($As_2S_3$). Anhydrous hydrogen fluoride containing sufficiently reduced levels of arsenic suitable for use in chemical and oil refining processes is then recovered by distillation or filtration.

Thus, the present invention provides a process for purifying hydrogen fluoride comprising the steps of:
(a) contacting anhydrous hydrogen fluoride containing arsenic impurities with an effective amount of a sulfur compound capable of providing sulfide ions, and
(b) recovering purified anhydrous hydrogen fluoride having reduced amounts of arsenic impurities.

In one embodiment of the invention the arsenic impurities are comprised of trivalent arsenic which are precipitated by the use of hydrogen sulfide, an alkali metal sulfide, an alkaline earth metal sulfide or mixtures thereof. Preferably hydrogen sulfide is used. The purified anhydrous hydrogen fluoride is then recovered by either distillation, filtration or a combination of both.

It is an object of the present invention to provide a process for purifying anhydrous hydrogen fluoride to lower levels of arsenic impurities. It is a further object of the present invention to provide a process for purifying anhydrous fluoride which is economical, rapid and effective. It is still a further object of the invention to provide a process for treating technical or industrial grade anhydrous hydrogen fluoride with a high $As^{+3}$ content to provide anhydrous hydrogen fluoride containing less than about 100 ppm arsenic.

Fulfillment of these objects and the presence and fulfillment of other objects will be apparent upon complete reading of the specification and attached claims.

DESCRIPTION OF THE PREFERRED EMBODIMENT

The method of reducing the arsenic level in hydrogen fluoride according to the present invention is related primarily to the purification of technical or industrial grade anhydrous hydrogen fluoride, although the process is broadly applicable to any anhydrous hydrogen fluoride. For purposes of this invention, reference to technical or industrial grade anhydrous hydrogen fluoride means any commodity consisting of at least 95% by weight hydrogen fluoride (i.e., less than 5 weight % water). Typically, this will involve a product which is usually prepared by heating together a mixture of fluorspar and sulfuric acid which is then to be followed by fractional distillation. The purity of industrial grade anhydrous hydrogen fluoride derived from the above described method will depend upon the source of the fluorspar. Technical or industrial grade anhydrous hydrogen fluoride will contain various levels of impurities such as water as well as compounds of silicon, sulfur, bismuth, phosphorus and arsenic. Most of these impurities, except for arsenic, are readily removed by distillation. Thus, arsenic may be present in the distillate at levels of from about 50 ppm to about 1500 ppm, again depending upon the particular source of fluorspar.

In contrast to the previously described ultra-pure (i.e., impurity levels of a few ppb) anhydrous hydrogen fluoride required in electronic applications, technical or industrial grade anhydrous hydrogen fluoride containing, for example, from about 50 to 100 ppm arsenic impurities, can usually be used in chemical processing or oil refining industries without too much difficulty. However, when the arsenic impurity level is higher, catalyst deactivation (e.g., the antimony halide catalysts used in fluorinating chlorocarbons) is accelerated, and at very high arsenic levels (e.g., approximately 200 to 1500 ppm) corrosion of processing equipment can be severe if an oxidant, such as chlorine, is present.

The method of reducing the arsenic level in technical or industrial grade anhydrous hydrogen fluoride according to the present invention represents a very simple, economical, rapid and effective treatment of anhydrous hydrogen fluoride containing high levels of $As^{+3}$ to provide anhydrous hydrogen fluoride suitable for use in the chemical and oil refining processes. This process comprises treating anhydrous fluoride containing high levels of $As^{+3}$ with a sulfur-containing compound or, more specifically, a sulfur compound capable of providing sulfide ions. The sulfide-containing or sulfide ion-producing compound can generally be any such material or substance that dissociates in the presence of a polar solvent into the sulfide ion and a companion cation. Preferably, the sulfur compounds capable of providing the sulfide ion is, by way of example but not limited thereto, selected from the group consisting of hydrogen sulfide, alkali metal sulfides, such as sodium and potassium sulfide, alkaline earth metal sulfides, such as calcium and barium sulfide, and mixtures thereof. Most preferably, hydrogen sulfide is used as the sulfide ion source because of its availability, ease of use and ease of removal. Any excess hydrogen sulfide, which boils at $-60.3°$ C., can be readily separated from hydrogen fluoride which boils at about $20°$ C. The actual treating of the anhydrous hydrogen fluoride with a sulfide ion-producing compound according to the present invention can generally be by any method wherein the sulfide compound contacts the anhydrous hydrogen fluoride.

The amount of sulfide compound to be added to the anhydrous hydrogen fluoride will depend on the $As^{+3}$ content of the anhydrous hydrogen fluoride. At least a stoichiometric amount of sulfide relative to the conversion of $As^{+3}$ present to $As_2S_3$ should be used. Preferably, a stoichiometric excess of sulfide is employed so as to precipitate as much $As_2S_3$ as possible. By stoichiometric amount is meant that amount of sulfur compound that would provide an amount of sulfide ion to convert all of the $As^{+3}$ to insoluble and non-volatile $As_2S_3$, i.e., for every two moles of $As^{+3}$ there should be provided three moles of sulfide ion. The arsenic of concern is the $As^{+3}$ since $As^{+5}$, when present in anhydrous hydrogen fluoride, will be in the form of $AsF_5$ which is readily separated by distillation. Thus, according to the present invention the soluble and distillable $As^{+3}$ (as $AsF_3$) in anhydrous hydrogen fluoride is converted to the insoluble and non-distillable $As_2S_3$ by virtue of contact with a sulfur compound capable of providing sulfide ions. Purified anhydrous hydrogen fluoride can then be separated and recovered by distillation, filtration or a combination thereof and the like.

The process according to the present invention can be carried out at any convenient temperature. Temperatures in the range of from about $0°$ C. to about $100°$ C.

are useful. Since hydrogen fluoride boils at about 20° C., any treatment above the boiling point of hydrogen fluoride should preferably be in closed, pressurized system to ensure the presence of a liquid phase. The preferred temperature for the treatment is from about 5° C. to about 80° C. Generally, contact times of from about 1 minute to about 3 hours are sufficient, with shorter times for higher temperatures.

The apparatus and equipment employed in the process according to the present invention can be any such equipment as generally known in the art as being acceptable for use with anhydrous hydrogen fluoride. Thus, all surfaces of the distillation vessel, column, column packing, condenser and receiver which come into contact with hydrogen fluoride must be inert towards it. Suitable materials of construction are metals, such as low carbon steel, nickel and nickel alloys, such as "INCONEL", "HASTALLOY" Alloys B, C and D, "CARPENTER" 20, "DURIMET" 20 and platinum. Of these, low carbon steel is preferred from the standpoint of economy. Stainless steels are generally not suitable due to the possibility of trace contamination from alloy constituents. Polymeric materials such as polyethylene, unplasticized polyvinyl chloride and fluorocarbon polymers, such as "TEFLON", can also be used and, of these, "TEFLON" or similar fluorocarbon polymers are preferred.

The following example is presented to further illustrate a specific embodiment of the invention. In this example all references to parts and percentages are by weight unless otherwise indicated.

EXAMPLE

A cylinder containing a dip tube was charged with 96.6 g of anhydrous hydrogen fluoride which contained 1164 parts per million (ppm) of arsenic as $AsF_3$. The cylinder and its contents were cooled in "DRY ICE", and a total of 8.7 g of hydrogen sulfide was bubbled in through the dip leg over a 30 minute period. The cylinder valves were closed, the cylinder shaken and then vented at room temperature overnight. A total of 12.8 g was vented. The cylinder valves were closed, and the cylinder was heated at about 80° C. for 1 hour. The cylinder was cooled, and 41.2 g of the contents were vacuum-line distilled into a second "DRY ICE"-cooled cylinder. The distillate contained 37 ppm of arsenic, a 97% reduction. The remaining hydrogen fluoride in the cylinder was filtered through a 0.2 u filter. The filtrate contained 78 ppm arsenic, a 93% reduction.

Having thus described and exemplified the invention with a certain degree of particularity, it should be appreciated that the following claims are not to be so limited but are to be afforded a scope commensurate with the wording of each element of the claim and equivalents thereof.

I claim:
1. A process for purifying hydrogen fluoride comprising the steps of:
   (a) contacting anhydrous hydrogen fluoride containing arsenic impurities with an effective amount of a sulfur compound capable of providing sulfide ions to precipitate arsenic sulfide, and
   (b) recovering purified anhydrous hydrogen fluoride having reduced amounts of arsenic impurities.
2. A process of claim 1 wherein said arsenic impurities comprise trivalent arsenic.
3. A process of claims 1 or 2 wherein said sulfur compound is selected from the group consisting of hydrogen sulfide, alkali metal sulfides, alkaline earth metal sulfides and mixtures thereof.
4. A process of claims 1 or 2 wherein said sulfur compound is hydrogen sulfide.
5. A process of claims 1 or 2 wherein said recovery is by distillation.
6. A process of claims 1 or 2 wherein said recovery is by filtration.
7. A process of claim 3 wherein said recovery is by distillation.
8. A process of claim 3 wherein said recovery is by filtration.
9. A process of claim 4 wherein said recovery is by distillation.
10. A process of claim 4 wherein said recovery is by filtration.
11. A process for purifying hydrogen fluoride comprising the steps of:
    (a) contacting anhydrous hydrogen fluoride containing trivalent arsenic as an impurity with a stoichiometric excess of hydrogen sulfide wherein said stoichiometry is based on converting trivalent arsenic to $As_2S_3$, at a temperature from about 0° C. to about 100° C. for a period of time sufficient to precipitate $As_2S_3$, and
    (b) recovering purified anhydrous hydrogen fluoride with reduced amounts of trivalent arsenic.
12. A process of claim 11 wherein said recovering of purified anhydrous hydrogen fluoride is by distillation.
13. A process of claim 11 wherein said recovering of purified anhydrous hydrogen fluoride is by filtration.

* * * * *